US011951948B2

(12) United States Patent
Harmon et al.

(10) Patent No.: US 11,951,948 B2
(45) Date of Patent: Apr. 9, 2024

(54) DEPLOYABLE STEP FOR VEHICLE WITH EXTENDABLE CARGO BED

(71) Applicant: Ford Global Technologies, LLC, Dearborn, MI (US)

(72) Inventors: Michael John Harmon, Northville, MI (US); Ryan Mathew Sandor, North Wales, PA (US); Matthew B. Rutman, Canton, MI (US); Amol Borkar, Nagpur (IN); Hussain Z. Tajmahal, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 17/673,861

(22) Filed: Feb. 17, 2022

(65) Prior Publication Data

US 2023/0256910 A1 Aug. 17, 2023

(51) Int. Cl.
*B60R 3/02* (2006.01)
*B62D 33/02* (2006.01)
*B62D 33/027* (2006.01)
*B62D 33/03* (2006.01)

(52) U.S. Cl.
CPC ............ *B60R 3/02* (2013.01); *B62D 33/0273* (2013.01); *B62D 33/03* (2013.01)

(58) Field of Classification Search
CPC ................ B62D 25/2054; B62D 33/02; B62D 33/0273; B62D 33/03; B60P 1/003; B60R 3/02; B60R 9/06
See application file for complete search history.

(56) References Cited

U.S. PATENT DOCUMENTS

| | | | | |
|---|---|---|---|---|
| 2,784,027 A * | 3/1957 | Temp | ........................ | B60P 3/32 296/156 |
| 3,006,487 A * | 10/1961 | Gelli | ......................... | B60R 5/04 414/522 |
| 3,768,673 A * | 10/1973 | Nydam | .................... | B60P 1/433 296/26.1 |
| 4,900,217 A * | 2/1990 | Nelson | .................... | B60P 1/431 14/71.1 |
| 5,513,941 A * | 5/1996 | Kulas | ...................... | B60P 1/003 211/151 |
| 5,829,945 A * | 11/1998 | Stanley | .................... | B60P 1/433 414/522 |
| 6,042,923 A * | 3/2000 | Lewis | ...................... | B60P 1/433 428/68 |
| 6,454,338 B1 * | 9/2002 | Glickman | ............... | B60P 1/435 296/26.11 |
| 6,464,274 B2 * | 10/2002 | Mink | ...................... | B60P 1/003 414/522 |

(Continued)

OTHER PUBLICATIONS

Portable Vehicle Loading Ramps by Empire Covers Youtube video https://www.youtube.com/watch?v=NAkz_gHYGYU (Year: 2018).*

*Primary Examiner* — Gregory A Blankenship
(74) *Attorney, Agent, or Firm* — Vichit Chea; Carlson, Gaskey & Olds, P.C.

(57) ABSTRACT

A cargo bed system of a vehicle includes a floor assembly of a cargo bed. The floor assembly is configured to transition back-and-forth between a standard position and an extended position. A step that moves with the floor assembly back-and-forth between the standard position and the extended position. The step is movable back-and-forth between a stowed position and a deployed position.

18 Claims, 3 Drawing Sheets

(56) References Cited

U.S. PATENT DOCUMENTS

| | | | |
|---|---|---|---|
| 6,648,569 B2 | 11/2003 | Douglass et al. | |
| 6,921,120 B1* | 7/2005 | Ervin | B60P 3/40 |
| | | | 296/26.05 |
| 7,261,357 B1 | 8/2007 | Bechen | |
| 7,338,104 B1* | 3/2008 | Bejin | B62D 33/0273 |
| | | | 224/403 |
| 7,377,563 B1* | 5/2008 | Demick | B60R 19/48 |
| | | | 280/166 |
| 7,416,234 B2* | 8/2008 | Bequette | B60P 1/003 |
| | | | 414/522 |
| 7,524,156 B2* | 4/2009 | Garbes | B60P 1/43 |
| | | | 414/537 |
| 7,543,873 B1* | 6/2009 | Thornsberry | B60P 1/003 |
| | | | 224/403 |
| 7,976,264 B1* | 7/2011 | Pope | B60P 1/431 |
| | | | 414/537 |
| 8,240,527 B1* | 8/2012 | Casselton | B60R 9/065 |
| | | | 224/404 |
| 8,840,166 B1* | 9/2014 | Derbes | B60R 5/041 |
| | | | 224/403 |
| 9,487,148 B2 | 11/2016 | Kichline, Jr. et al. | |
| 9,902,328 B1 | 2/2018 | Mazur | |
| 10,017,092 B1* | 7/2018 | Chastain, Jr. | B60P 1/433 |
| 10,040,385 B2* | 8/2018 | Stevens | B60P 1/43 |
| 10,449,904 B2 | 10/2019 | Feinberg et al. | |
| 10,518,708 B1* | 12/2019 | Honer | B60R 3/02 |
| 10,639,972 B1* | 5/2020 | Lillo | B60G 11/27 |
| 10,661,842 B2 | 5/2020 | Povinelli et al. | |
| 10,829,059 B1* | 11/2020 | Addison | B60P 1/433 |
| 10,906,468 B1* | 2/2021 | Crim | B62D 33/0273 |
| 11,059,423 B1* | 7/2021 | Weaver | B62D 33/027 |
| 11,148,598 B1* | 10/2021 | Eman-Henshaw | B60R 9/06 |
| 2002/0180231 A1* | 12/2002 | Fox | B60P 3/40 |
| | | | 296/26.09 |
| 2003/0170090 A1* | 9/2003 | Douglas | B60P 1/003 |
| | | | 410/91 |
| 2004/0200695 A1* | 10/2004 | Armour | B60P 1/003 |
| | | | 198/414 |
| 2004/0226116 A1* | 11/2004 | O'Donnell | B60P 1/431 |
| | | | 14/69.5 |
| 2006/0284437 A1* | 12/2006 | Collins | B60P 1/003 |
| | | | 296/37.6 |
| 2007/0237614 A1* | 10/2007 | Johnson | B60P 1/431 |
| | | | 414/467 |
| 2009/0195007 A1* | 8/2009 | Miller | B60P 3/40 |
| | | | 296/26.11 |
| 2010/0283279 A1* | 11/2010 | Suzuki | B60R 5/041 |
| | | | 296/26.09 |
| 2013/0087590 A1* | 4/2013 | Lee | B60R 5/04 |
| | | | 224/496 |
| 2013/0341949 A1* | 12/2013 | Bernthisel | B62D 33/0273 |
| | | | 296/26.09 |
| 2014/0356117 A1* | 12/2014 | Barger | A61B 6/02 |
| | | | 29/428 |
| 2016/0059763 A1* | 3/2016 | Sindoni, Jr. | B60P 1/431 |
| | | | 414/537 |
| 2017/0036872 A1* | 2/2017 | Wallace | B60R 5/041 |
| 2017/0267150 A1* | 9/2017 | Bergen | B60P 1/431 |
| 2017/0298675 A1* | 10/2017 | Dimig | B60R 3/02 |
| 2018/0037274 A1* | 2/2018 | Mathis | B62D 33/02 |
| 2019/0037799 A1* | 2/2019 | Murray | A01K 1/0272 |
| 2020/0070898 A1* | 3/2020 | Salvia, III | B62D 33/037 |
| 2020/0406986 A1* | 12/2020 | Sosnowich | B62D 33/0207 |
| 2022/0161870 A1* | 5/2022 | Horner | B60R 3/02 |
| 2022/0176861 A1* | 6/2022 | Haigler | B66F 7/12 |
| 2022/0289312 A1* | 9/2022 | Aquila | B60R 5/02 |
| 2022/0355870 A1* | 11/2022 | Dylewski, II | B62D 43/02 |
| 2022/0396319 A1* | 12/2022 | Christensen | B60R 5/041 |
| 2023/0008195 A1* | 1/2023 | Salter | B62D 33/037 |
| 2023/0022042 A1* | 1/2023 | Watson | B60Q 1/0076 |

* cited by examiner

DEPLOYABLE STEP FOR VEHICLE WITH EXTENDABLE CARGO BED

TECHNICAL FIELD

This disclosure relates generally to a step for a vehicle and, more particularly, to a step that is used in connection with an extendable cargo bed.

BACKGROUND

Some vehicles, such as pickup trucks, include a cargo bed. Users utilize cargo beds to carry various types of cargo. The cargo bed can be located behind a passenger compartment of the vehicle. A tailgate can enclose an aft end of the cargo bed.

SUMMARY

In some aspects, the techniques described herein relate to a cargo bed system of a vehicle, including: a floor assembly of a cargo bed, the floor assembly configured to transition back-and-forth between a standard position and an extended position; and at least one step that moves with the floor assembly back-and-forth between the standard position and the extended position, the at least one step movable back-and-forth between a stowed position and a deployed position.

In some aspects, the techniques described herein relate to a cargo bed system, wherein the at least one step is movable back-and-forth between the stowed position and the deployed position when the floor assembly is in the standard position, and the at least one step is movable back-and-forth between the stowed position and the deployed position when the floor assembly is in the extended position.

In some aspects, the techniques described herein relate to a cargo bed system, wherein the at least one step includes a first step and a second step.

In some aspects, the techniques described herein relate to a cargo bed system, wherein the first step and the second step are independently movable back-and-forth between the deployed position and the stowed position.

In some aspects, the techniques described herein relate to a cargo bed system, wherein the first step is on a driver side of the vehicle, and the second step is on a passenger side of the vehicle.

In some aspects, the techniques described herein relate to a cargo bed system, wherein the at least one step is entirely vertically beneath the floor assembly when the at least one step is in the stowed position.

In some aspects, the techniques described herein relate to a cargo bed system, wherein the at least one step is entirely vertically above a rear bumper of the vehicle when the at least one step is in the stowed position.

In some aspects, the techniques described herein relate to a cargo bed system, wherein the at least one step includes a step platform pivotably connected to at least one support arm assembly, the step platform suspended from the at least one support arm assembly when the at least one step is in the deployed position.

In some aspects, the techniques described herein relate to a cargo bed system, further including at least one bracket secured to a vertically bottom surface of the floor assembly, the at least one bracket receiving the at least one support arm assembly when the at least one step is in the deployed position.

In some aspects, the techniques described herein relate to a cargo bed system, wherein the at least one step includes a step platform that is vertically above a bumper of the vehicle when the at least one step is in the stowed position, and is vertically beneath the bumper of the vehicle when the at least one step is in the deployed position.

In some aspects, the techniques described herein relate to a cargo bed system, further including an actuator that drives extension and retraction of the floor assembly.

In some aspects, the techniques described herein relate to a cargo bed system, further including a tailgate having a first door and a second door, the first door configured to pivot about a first vertically extending axis back and forth between a closed position and a fully open position, the second door configured to pivot about a second vertically extending axis back and forth between a closed position and a fully open position.

In some aspects, the techniques described herein relate to a cargo bed system, wherein the first door provides a driver side wall for an extended portion of the floor assembly when the floor assembly is in the extended position, wherein the first door provides a passenger side wall for an extended portion of the floor assembly when the floor assembly is in the extended position.

In some aspects, the techniques described herein relate to an extendable cargo bed accessing method, including: transitioning a floor assembly for a cargo bed of a vehicle from a standard position and an extended position; and moving at least one step together with the floor assembly during the transitioning, the at least one step movable from a stowed position to a deployed position when the floor assembly is in the standard position and when the floor assembly is in the extended position.

In some aspects, the techniques described herein relate to a method, further including sliding the floor assembly back-and-forth between the standard position and the extended position.

In some aspects, the techniques described herein relate to a method, wherein the at least one step is disposed directly beneath the floor assembly when the floor assembly is in the stowed position.

In some aspects, the techniques described herein relate to a method, wherein the at least one step in the deployed position includes a step platform pivotably connected to at least one support arm assembly, the step platform suspended from the at least one support arm assembly such that the step platform is vertically beneath a bumper of the vehicle.

In some aspects, the techniques described herein relate to a method, wherein the step platform is vertically above the bumper when the at least one step is in the stowed position.

In some aspects, the techniques described herein relate to a method, wherein the at least one step includes a first step is on a driver side of the vehicle, and a second step is on a passenger side of the vehicle.

In some aspects, the techniques described herein relate to a method, wherein the first step and the second step are movable back-and-forth between the stowed position and the deployed position independently from each other.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle having a cargo bed that can be extended and retracted, and at least one extendable step. The extendable step can be deployed when the cargo bed is extended or when the cargo bed is retracted.

Figure 1:
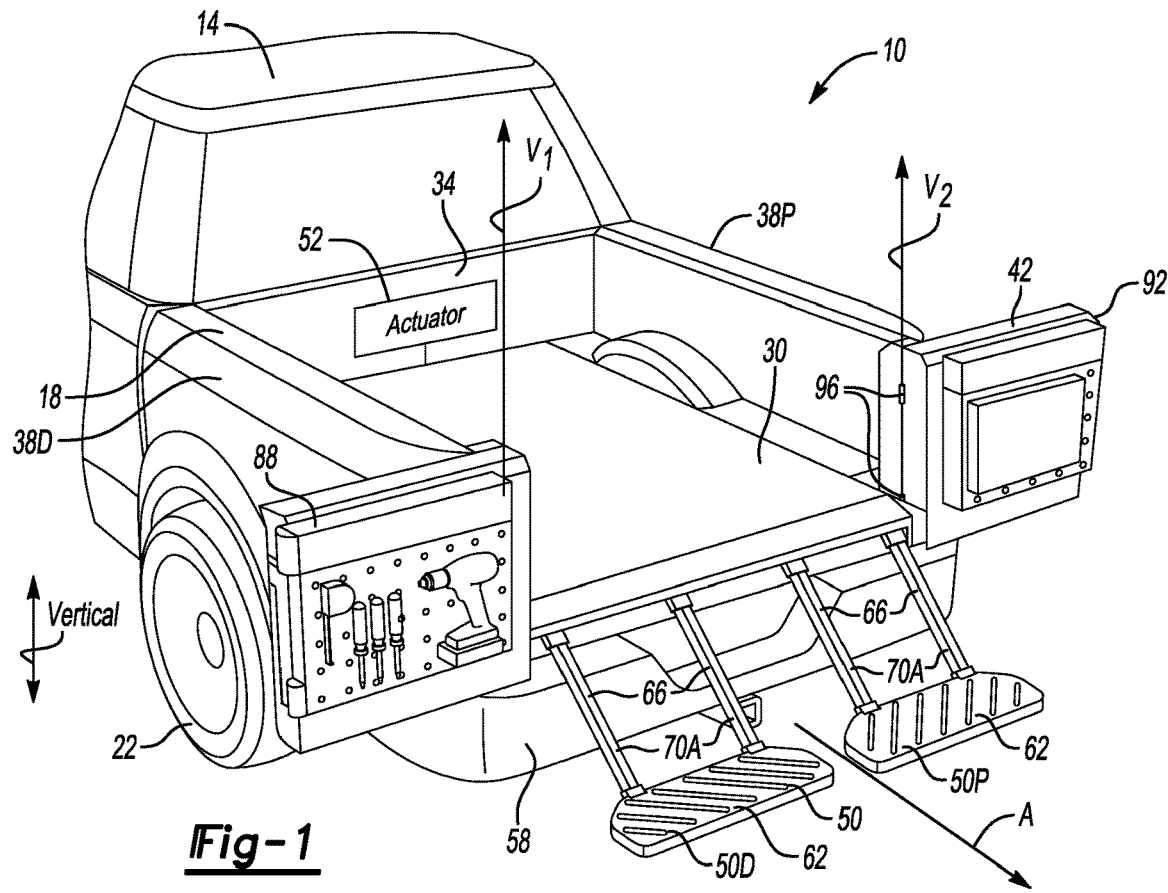
FIG. 1 illustrates a vehicle having a cargo bed with the cargo bed in a standard position and at least one step in a deployed position.
Figure 2:
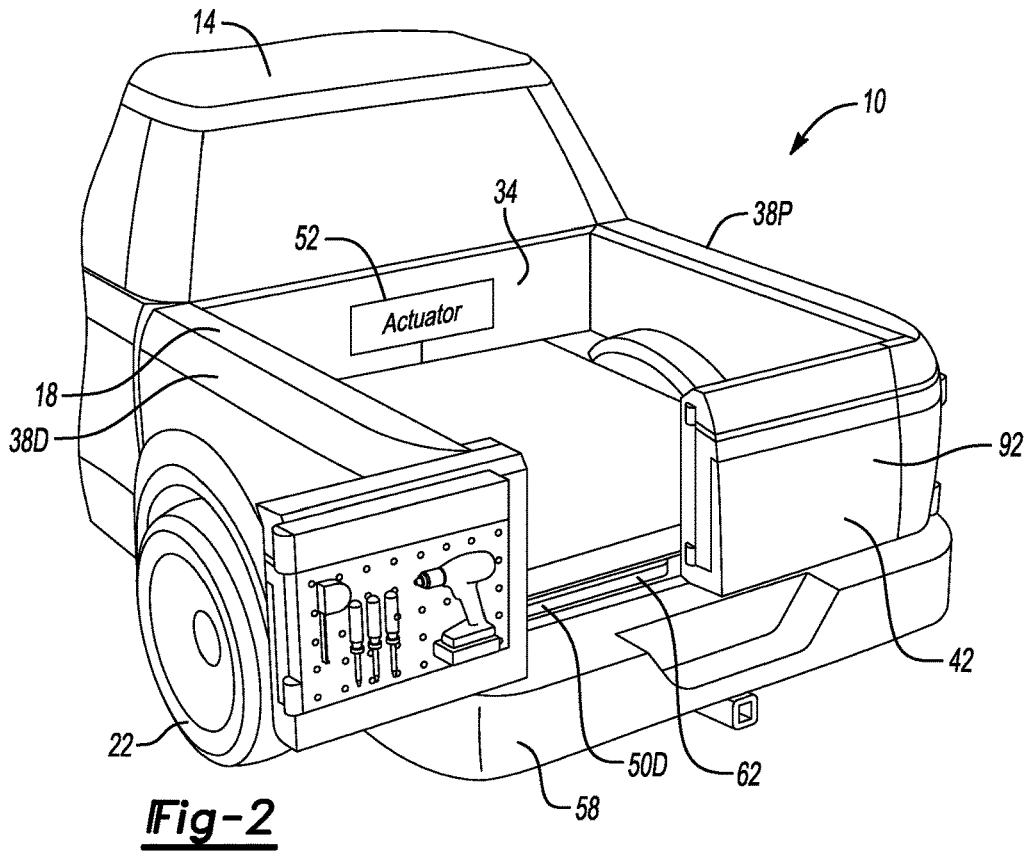
FIG. 2 illustrates the vehicle of FIG. 1 with the at least one step in a stowed position and a tailgate door of a tailgate assembly in a fully open position.

With reference to FIGS. 1 and 2, a vehicle 10 includes a passenger compartment 14 and a cargo bed 18 that is aft the passenger compartment 14 along a longitudinal axis A of the vehicle 10.

In the exemplary embodiment, the vehicle 10 is a pickup truck. The vehicle 10 could be another type of vehicle in another example, such as a car, van, sport utility vehicle, etc. The vehicle 10 has a unibody architecture. In another embodiment, the vehicle 10 could have a body-on-frame architecture.

The example vehicle 10 is an electrified vehicle. In particular, the vehicle 10 is a battery electric vehicle. In another example, the vehicle 10 could be another type of electrified vehicle, such as a plug-in hybrid electric vehicle (PHEV), or a conventional vehicle.

The example vehicle 10 includes an electrified powertrain capable of applying a torque from an electric machine (e.g., an electric motor) to drive wheels 22. The vehicle 10 can include a traction battery pack, which powers the electric machine and, potentially, other electrical loads of the vehicle 10. The powertrain of the vehicle 10 may electrically propel the drive wheels 22 either with or without the assistance of an internal combustion engine.

Figure 3:
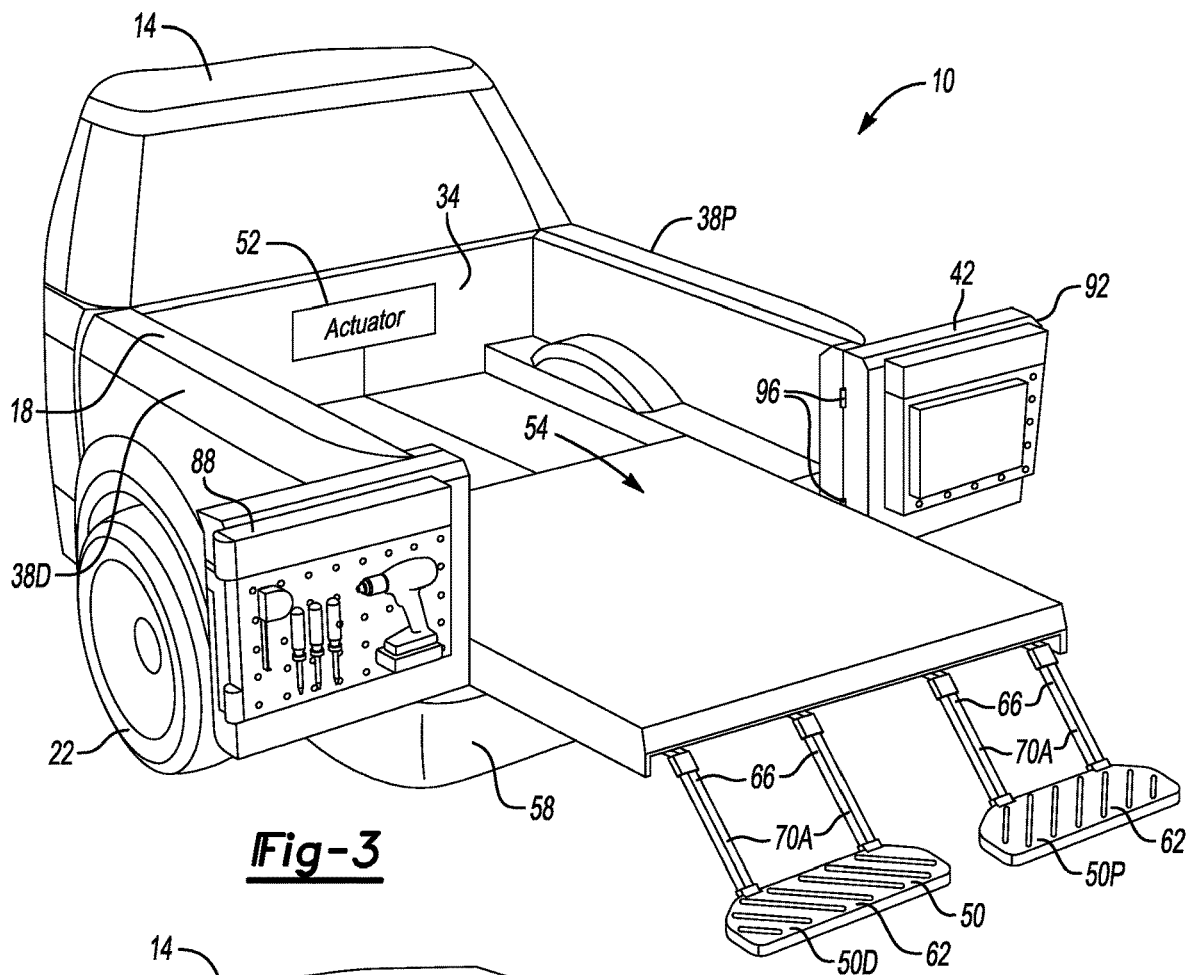
FIG. 3 illustrates the vehicle of FIG. 1 with the cargo bed in an extended position and the at least one step in the deployed position.
Figure 4:
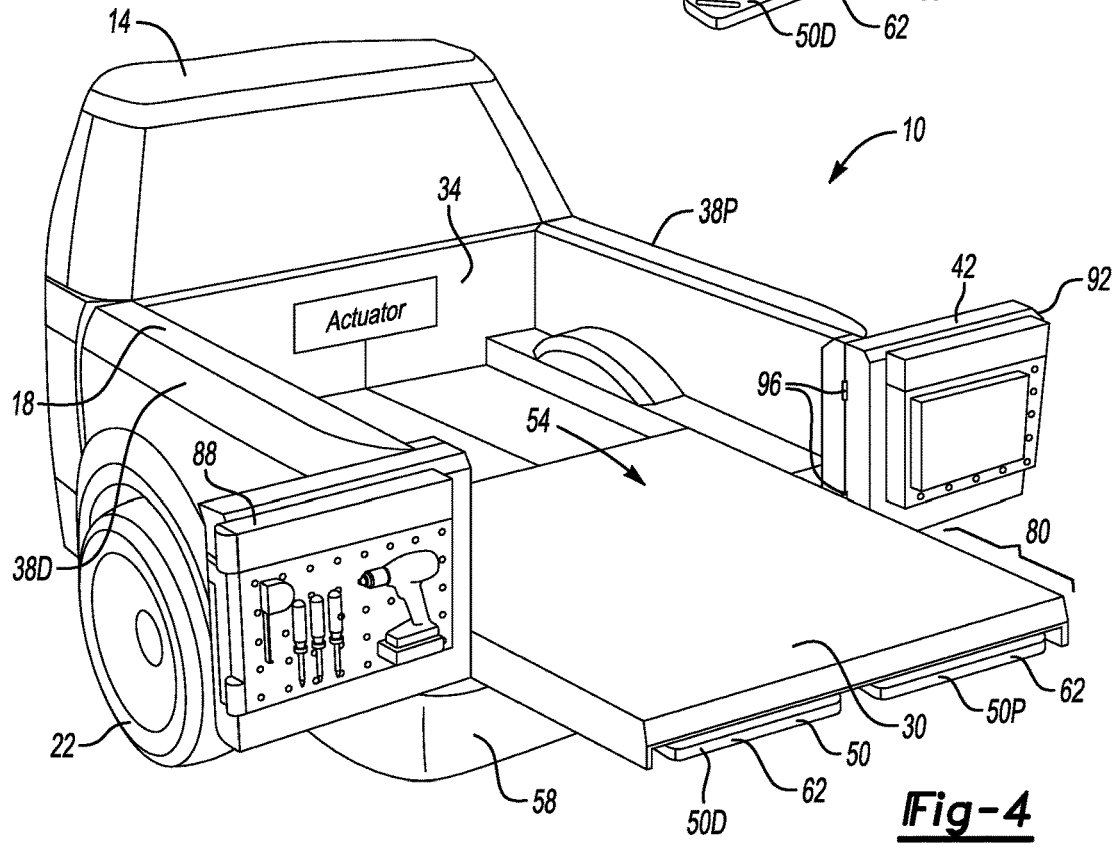
FIG. 4 illustrates the vehicle of FIG. 3 with the at least one step in the stowed position.

Generally, the cargo bed 18 includes a floor assembly 30, a front wall 34, a first side wall 38D, a second side wall 38P, and a tailgate assembly 42. The floor assembly 30 is configured to transition back-and-forth between a standard position as shown in FIGS. 1 and 2, and an extended position as shown in FIGS. 3 and 4.

The vehicle 10 includes at least one step 50 that moves together with the floor assembly 30 back-and-forth between the standard position and the extended position. The at least one step 50 can be moved to a deployed position as shown in FIGS. 1 and 3, or a stowed position as shown in FIGS. 2 and 4. That is, the at least one step 50 is movable back-and-forth between the stowed position and the deployed position when the floor assembly 30 is in the standard position, and when the floor assembly 30 is in the extended position.

In this example, the at least one step 50 is in the stowed position when the at least one step 50 moves with the floor assembly 30 back-and-forth between the standard position and the extended position. An actuator 52, which is schematically shown in FIGS. 1 and 3, could be used to move the floor assembly 30 back-and-forth between the extended position and the standard position. The actuator 52 could be a screw-type actuator, for example. The actuator 52 slides the floor assembly 30 back-and-forth between the standard position and the extended position in this example. The actuators 52 could extend and retract in response to command from a button on the vehicle 10 or an input from a handheld device, such as a smartphone. In another example, a user could manually move the floor assembly 30 back-and-forth between the extended position and the standard position.

In the extended position, the cargo bed 18 can transport larger cargo than when the bed is in the standard position of FIGS. 1 and 2. The user could also extend the cargo bed 18 to provide a work surface 54 for the user. The floor assembly 30 is part of a cargo bed system that enables the cargo bed 18 to be transitioned back-and-forth between the standard position of FIG. 1 and the extended position of FIG. 2. When the cargo bed 18 is in the standard position, the floor assembly 30 is in a standard position. When the cargo bed 18 is in the extended position, the floor assembly 30 is in an extended position.

The at least one step 50, in this example, includes a first step 50D on a driver side of the vehicle 10 and a second step 50P on a passenger side of the vehicle 10. The first step 50D and the second step 50P are independently movable back-and-forth between the deployed position and the stowed position. That is, the first step 50D could be deployed while the second step 50P is stowed, or vice versa.

In this example, when the first step 50D and the second step 50P are in the stowed position, the first step 50D and the second step 50P are each entirely vertically beneath the floor assembly 30. That is, no portion of the first step 50D or the second step 50P protrudes rearward from the floor assembly 30 when the first step 50D and the second step 50P are in the stowed position.

Further, in this example, when the first step 50D and the second step 50P are in the stowed position, the first step 50D and the second step 50P are each entirely vertically above a rear bumper 58 of the vehicle 10. Vertical, for purposes of this disclosure, is with reference to ground and a general orientation of the vehicle 10 during operation.

When in the deployed position, a user can utilize the at least one step 50 to climb into and out of the cargo bed 18. When not needed, the at least one step 50 can be moved to stowed position of FIG. 3. The at least one step 50 can be moved back-back-and-forth between the stowed position and the extended position when the cargo bed 18 is in the standard position of FIGS. 1 and 2.

The tailgate assembly 42 of the example vehicle 10 is a split tailgate having a first door 88 and a second door 92. The first door 88 is configured to pivot about a first vertically extending axis $V_1$ back and forth between a closed position and a fully open position. The second door 92 is configured to pivot about a second vertically extending axis $V_2$ back and forth between a closed position and a fully open position. In this example, the first door 88 is on a driver side of the vehicle 10, and the second door 92 is on the passenger side of the vehicle 10. The first door 88 and the second door 92 are similarly sized in this example. The first door 88 and the second door 92 each account for about fifty percent of the tailgate assembly 42.

When the first door 88 and the second door 92 are in the fully open position, the floor assembly 30 can be moved to the extended position as shown in FIGS. 3 and 4. A user can then use the floor assembly 30 as a workbench. In this position, the extended portion 80 providing the workbench can be accessed from three sides.

Figure 5:
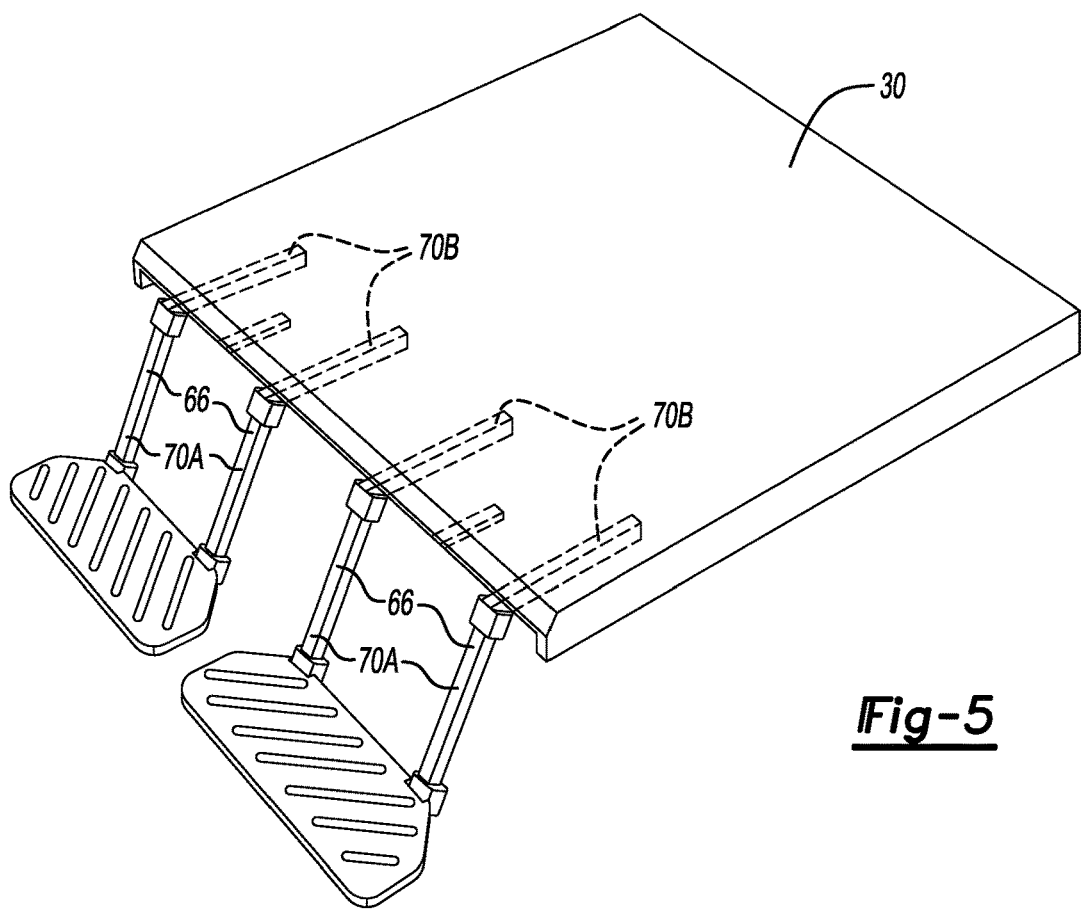
FIG. 5 illustrates a top view of the floor of the cargo bed of FIGS. 1 and 3 with the at least one step in the deployed position.
Figure 6:
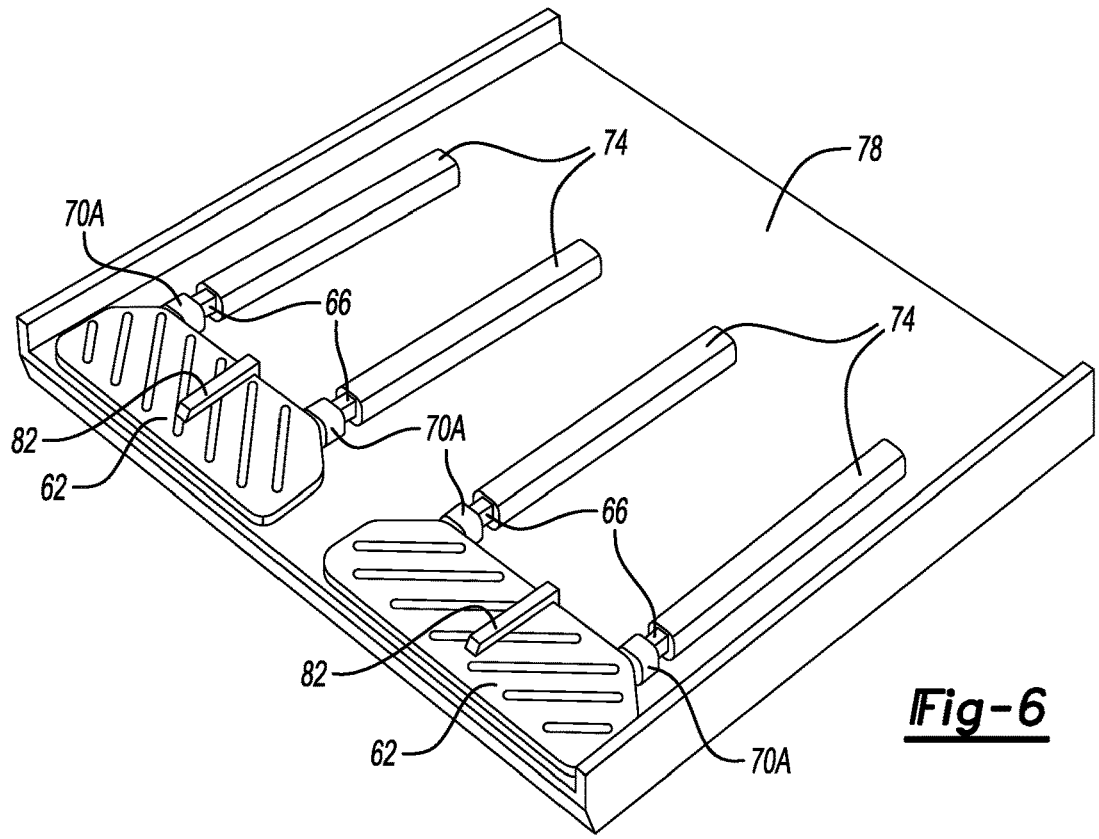
FIG. 6 illustrates a bottom view of the floor of the cargo bed of FIGS. 2 and 4 with the at least one step in the stowed position.

With reference now to FIGS. 5 and 6, the first step 50D and the second step 50P each include a step platform 62 that is pivotably coupled to a pair of support arm assemblies 66. Other examples could include a single support arm assembly, or more than two support arm assemblies. When the first step 50D and the second step 50P are in the deployed position, the respective step platforms 62 are suspended from the pairs of support arm assemblies 66.

The support arm assemblies 66 each include a first section 70A and a second section 70B. The first section 70A and the second section 70B are pivotable relative to each other. When the respective first step 50D or second step 50P is in the stowed position, the first sections 70A and second sections 70B are arranged horizontally and are each received within a bracket 74 on an underside 78 of the floor assembly 30. When the respective first step 50D or second step 50P is in the deployed position, the first sections 70A extend rearward and downward while the second sections 70B remain oriented horizontally within the respective bracket 74.

When the at least one step 50 is in the stowed position, a user can grasp the step platform 62 and pull the at least one step 50 rearward to transition the at least one step 50 to the deployed position. The user can lift the step platform 62 and push the at least step 50 forward to transition the at least one step 50 back to the stowed position beneath the floor assembly 30. Clips 82 can be used to hold the at least one step 50 in the stowed position.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A cargo bed system of a vehicle, comprising:
   a floor assembly of a cargo bed, the floor assembly configured to transition back-and-forth between a standard position and an extended position; and
   at least one step that moves with the floor assembly back-and-forth between the standard position and the extended position, the at least one step movable back-and-forth between a stowed position and a deployed position, the at least one step is supported entirely by the vehicle when in the deployed position.

2. The cargo bed system of claim 1, wherein the at least one step is movable back-and-forth between the stowed position and the deployed position when the floor assembly is in the standard position, and the at least one step is movable back-and-forth between the stowed position and the deployed position when the floor assembly is in the extended position.

3. The cargo bed system of claim 2, wherein the at least one step comprises a first step and a second step.

4. The cargo bed system of claim 3, wherein the first step and the second step are independently movable back-and-forth between the deployed position and the stowed position.

5. The cargo bed system of claim 1, wherein the at least one step is entirely vertically beneath the floor assembly when the at least one step is in the stowed position.

6. The cargo bed system of claim 1, wherein the at least one step includes a step platform pivotably connected to at least one support arm assembly, the step platform suspended from the at least one support arm assembly when the at least one step is in the deployed position.

7. The cargo bed system of claim 6, further comprising at least one bracket secured to a vertically bottom surface of the floor assembly, the at least one bracket receiving the at least one support arm assembly when the at least one step is in the deployed position.

8. The cargo bed system of claim 1, wherein the at least one step includes a step platform that is vertically above a bumper of the vehicle when the at least one step is in the stowed position, and is vertically beneath the bumper of the vehicle when the at least one step is in the deployed position.

9. The cargo bed system of claim 1, further comprising an actuator that drives extension and retraction of the floor assembly.

10. The cargo bed system of claim 1, further comprising a tailgate having a first door and a second door, the first door configured to pivot about a first vertically extending axis back and forth between a closed position and a fully open position, the second door configured to pivot about a second vertically extending axis back and forth between a closed position and a fully open position.

11. The cargo bed system of claim 10, wherein the first door provides a driver side wall for an extended portion of the floor assembly when the floor assembly is in the extended position, wherein the first door provides a passenger side wall for an extended portion of the floor assembly when the floor assembly is in the extended position.

12. An extendable cargo bed accessing method, comprising:
    transitioning a floor assembly for a cargo bed of a vehicle from a standard position and an extended position; and
    moving at least one step together with the floor assembly during the transitioning, the at least one step movable from a stowed position to a deployed position when the floor assembly is in the standard position and when the floor assembly is in the extended position, the at least one step is supported entirely by the vehicle when in the deployed position.

13. The method of claim 12, further comprising sliding the floor assembly back-and-forth between the standard position and the extended position.

14. The method of claim 12, wherein the at least one step is disposed directly beneath the floor assembly when the floor assembly is in the standard position.

15. The method of claim 12, wherein the at least one step in the deployed position includes a step platform pivotably connected to at least one support arm assembly, the step platform suspended from the at least one support arm assembly such that the step platform is vertically beneath a bumper of the vehicle.

16. The method of claim 15, wherein the step platform is vertically above the bumper when the at least one step is in the stowed position.

17. The method of claim 15, wherein the at least one step includes a first step is on a driver side of the vehicle, and a second step is on a passenger side of the vehicle, wherein the first step and the second step are movable back-and-forth between the stowed position and the deployed position independently from each other.

18. A cargo bed system of a vehicle, comprising:
    a floor assembly of a cargo bed, the floor assembly configured to transition back-and-forth between a standard position and an extended position; and
    at least one step that moves with the floor assembly back-and-forth between the standard position and the extended position, the at least one step movable back-and-forth between a stowed position and a deployed position wherein the at least one step is movable back-and-forth between the stowed position and the deployed position when the floor assembly is in the standard position, and the at least one step is movable back-and-forth between the stowed position and the deployed position when the floor assembly is in the extended position, wherein the at least one step comprises a first step and a second step, wherein the first step and the second step are independently movable back-and-forth between the deployed position and the stowed position, wherein the first step includes no more than one step platform, the step platform pivotably connected to at least one support arm assembly, the step platform suspended from the at least one support arm assembly at a position vertically above ground when the at least one step is in the deployed position.

\* \* \* \* \*